Figure 1:
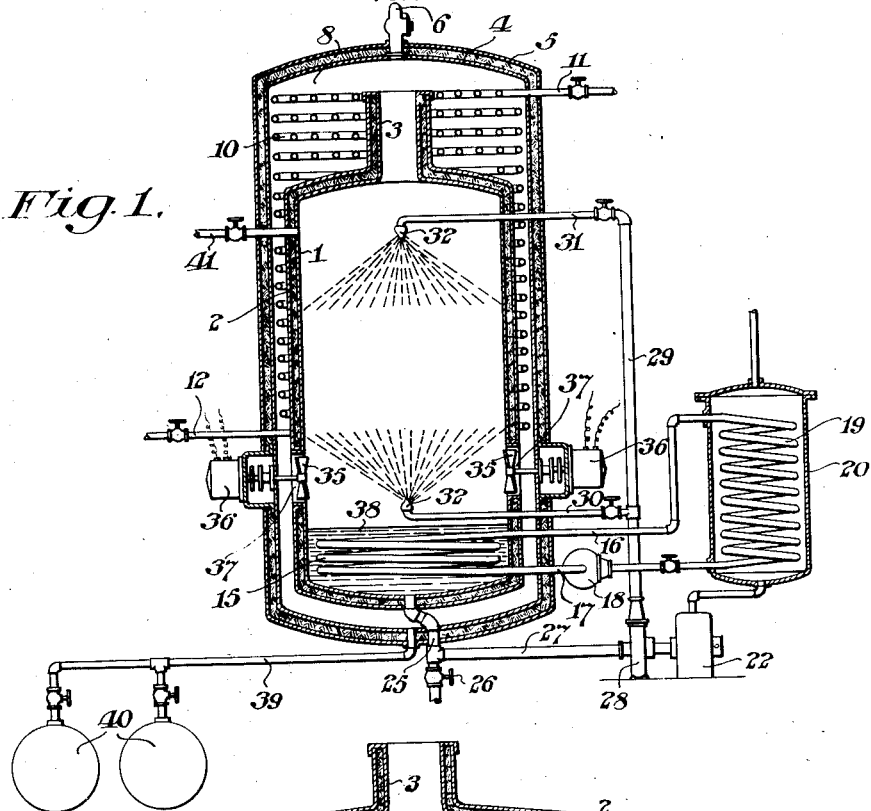

Sept. 15, 1925

C. H. CASPAR 1,553,748

PROCESS AND APPARATUS FOR DEALCOHOLIZATION OF BEVERAGES AND OTHER LIQUIDS

Filed Feb. 21, 1920

INVENTOR:
Charles H. Caspar,

WITNESS
F. J. Hartman.

BY
ATTORNEYS.

Patented Sept. 15, 1925.

1,553,748

UNITED STATES PATENT OFFICE.

CHARLES H. CASPAR, OF PHILADELPHIA, PENNSYLVANIA.

PROCESS AND APPARATUS FOR DEALCOHOLIZATION OF BEVERAGES AND OTHER LIQUIDS.

Application filed February 21, 1920. Serial No. 360,488.

*To all whom it may concern:*

Be it known that I, CHARLES H. CASPAR, a citizen of the United States, and a resident of Philadelphia, county of Philadelphia, and State of Pennsylvania, have invented a new and useful Process and Apparatus for Dealcoholization of Beverages and Other Liquids, of which the following is a specification, reference being had to the accompanying drawing.

Among the principal objects of my invention is to provide a process for the dealcoholization of beverages and other liquids which may be employed to reduce the alcoholic content of a given liquid without materially affecting the taste or other characteristics thereof through the extraction of the so-called ethers, aromas or bouquets during the performance of the process.

Further objects of my invention are to provide a process for the dealcoholization of beverages and other liquids which may be carried out at relatively low temperatures compared to those employed in processes of dealcoholization now in use, and which may be operated satisfactorily independently of the pressure existing within the apparatus, whether the same be above or below that of the external atmosphere.

Still further objects of my invention are to provide a process for the dealcoholization of beverages and other liquids which may be utilized economically and with satisfactory results to reduce the alcoholic content of various liquids irrespective of the initial alcoholic content thereof, and to provide an apparatus suitable and effective for carrying out the process as hereinafter described.

My invention further includes all of the other various novel objects, steps and operations, as well as features of construction and arrangement of the different parts of the apparatus, hereinafter more specifically referred to or described.

In processes of dealcoholization at present employed, it is customary to raise the temperature of the liquid to be dealcoholized to, and maintain it at, its boiling point, either at atmospheric pressure, or under a suitable vacuum, thereby causing the evaporation of the alcoholic content, or the desired portion thereof. However, at the temperatures required under these conditions, a large portion of the ethers, aromas and bouquets are driven off with the alcohol and lost. In carrying out my invention, however, I maintain the beverage or other liquid being treated at such a temperature that these undesirable results do not occur, so that, after treatment, the original flavor and other characteristics of the beverage, save such as result from the diminution of the alcoholic content, are substantially unaffected.

Figure 2:
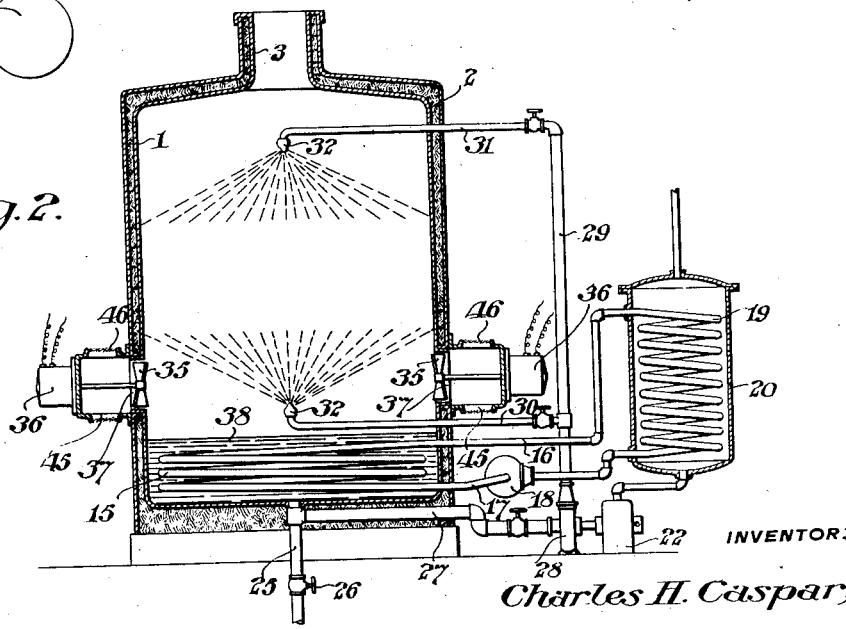

In carrying out my process, I may employ any suitable apparatus for accomplishing the results desired, but prefer to utilize an apparatus constructed substantially as shown somewhat diagrammatically in the accompanying drawings, in which Figure 1 is a vertical central section through one form thereof, in which provision is made for collecting that portion of the alcohol content removed from the liquid being treated so that the same may not be lost, while Fig. 2 is a vertical central section through a slightly modified form of the apparatus, in which no such provision is made, the alcoholic content passing from the apparatus directly into the surrounding atmosphere without being reclaimed.

Referring now more particularly to the form of the apparatus shown in Fig. 1, the same may consist of an inner tank 1 preferably substantially in the form of a vertically positioned, elongated, double walled cylinder, the space 2 between the walls being preferably filled with suitable heat insulating material. The cylinder is preferably open at the top and provided with a neck 3 of an internal diameter considerably less than that of the body of the tank, and is completely surrounded and contained within a preferably double walled casing 4 having heat insulating material 5 between its walls. The outer casing may preferably be provided with a safety vent 6 and maintained in upright position by suitable supporting means, not shown, while the tank 1 is also rigidly supported within the casing and spaced from the inner wall thereof so that an air space or chamber 8 is formed between the tank and the casing.

Positioned within the upper part of the casing and extending downwardly therein so as to surround the upper portion of the tank, are a plurality of cooling coils 10 connected by the pipes 11 and 12 with suitable means, not shown, for maintaining a given temperature in the coils by the circulation of a suitable cooling medium therein, and within the lower part of the tank is positioned another coil 15, connections 16 and 17 leading therefrom through a suitably driven pump 18 to a heating coil 19 positioned within a casing 20 preferably adjacent the casing 4, provision being made, preferably through utilization of the exhaust steam from a turbine 22 or other source of power to heat coil 19 and its contained heating medium to such temperature as may be desired, although the coil may be heated in any other suitable or convenient manner.

The tank 1 may be provided at its lowermost point with an outlet pipe 25 controlled by a valve 26 by means of which the contents of the tank may be drained when desired, and above the valve a pipe 27 is extended from pipe 26 to a suitable pump 28 conveniently driven by the turbine 22 which serves to pump the beverage or other liquid from within the tank upwardly through a vertically extending pipe 29 provided with two inwardly directed branches 30 and 31, which pass through the walls of the casing and tank and terminate adjacent the center of the latter in spray nozzles 32, the lowermost of which is directed upwardly and the uppermost downwardly, so that as the liquid is pumped from the bottom of the tank through the various pipes just described, it will be discharged in finely divided form within the tank in oppositely directed sprays as indicated in broken lines in the said figure.

For the purpose of causing a circulation of gas and vapor from the chamber 8 through the tank and thence upwardly through the neck 3 to the upper part of the chamber, one or more fans 35, each preferably driven by a motor 36, are positioned in suitable openings 37 in the walls of the tank at a point somewhat above the level of the beverage or other liquid 38 which is to be dealcoholized, and for the purpose of drawing off the alcohol which in the process collects in the casing in the form of low wines, the bottom of the casing is provided with a drain pipe 39 connected with the receivers 40.

In carrying out my process with an apparatus substantially in the form of that described, I introduce into the tank through an inlet pipe 41 or in any other convenient way, a sufficient quantity of the beverage or other liquid to be treated to cover the coil 15, but not enough to escape through the apertures 37, it being, of course, understood that the valve 26 is closed, and the inlet as well, after the liquid has been admitted.

When utilizing a form of apparatus such as is shown in Fig. 1, which may be closed against the entrance of air, I prefer at this point to expel the air from within the apparatus through the vent 6, which may be readily accomplished by causing a circulation of the liquid within the apparatus as hereinafter described until a sufficient amount of gases and vapors have been given off to displace the air and completely fill the interior of the apparatus, after which the vent, which may preferably be operative to relieve excessive pressure within the apparatus, may be closed to prevent the ingress of atmospheric air.

As the effectiveness of the process depends on the maintenance of a difference in temperature between the gases or vapors in the casing and the liquid in the tank, assume, by way of example only, that the liquid is introduced at a temperature of say 40° F., at which temperature, through suitable manipulation of the coil 15, it will be substantially maintained while the process is in operation. The gases, air or other vapors within the casing, however, should be maintained at a lower temperature during the process, for example, say at approximately 20° F. by suitable manipulation of the cooling coils 10, so that at all times a difference in the example given, of substantially 20° F. will exist between the liquid being treated and the gases and vapors within the casing. These conditions having been brought about, the circulating pump 28 is started and the beverage or other liquid pumped from the bottom of the tank to the spray nozzles 32, from which it is ejected within the tank in the form of a fine spray, and at the same time the fans 35 are set in motion to cause a continuous circulation of the vapors from the chamber 8, through apertures 37 and the sprayed liquid within the tank, thence from the neck 3 over the cooling coils 10 and again through the apertures 37. Thus, a constant and rapid circulation of the vapors is maintained through the sprayed liquid, and the alcohol contained therein evaporates therefrom, and passing over the cooling coils is condensed and collects in the form of low wines in the bottom of the casing, from which it may be drawn off into the receptacles 40 from time to time as may be desired, the process being ordinarily continued until the desired amount of alcohol is abstracted from the liquid undergoing treatment as may be ascertained by suitable tests from time to time.

It will be understood that, as during the process heat units are abstracted from the liquid and taken up by the gases and vapors thereby tending to equalize the respective temperatures of latter and liquid, it is necessary to employ the heating coil 15 or other suitable means for supplying heat to the liquid to replace that which is abstracted therefrom, and it is also desirable for economical and satisfactory performance of the process to continuously cool the cooling coils 10 in any suitable manner, as by the circulation of a cooling medium therethrough, in order to maintain the gases and vapors in contact with the liquid at a temperature relatively low as compared thereto.

It will be further understood that such of the ethers, aromas or bouquets of the beverage or other liquid being treated which may be taken up by the gaseous medium during the process will not condense out with the alcohol in appreciable quantities under the temperatures at which the process is ordinarily performed, but remain suspended in the gases and vapors within the casing, thus merely tending to elevate the pressure therein above that initially present and returning to the liquid at the termination of the process in substantially their original form, so that the original flavor and other characteristics of the beverage will not be materially disturbed by reason of its having undergone the dealcoholizing treatment.

In Fig. 2 I have illustrated a somewhat modified form of apparatus suitable for carrying out my process of dealcoholization but in which no provision is made for reclaiming the alcohol abstracted from the liquid being treated, the same numerals being used to designate parts corresponding to parts already described in connection with Fig. 1. In this form of apparatus the tank 1, having a neck 3, is open to the external atmosphere and a heating coil 15 is provided in the tank with means for heating the coil similar to those already described, as well as means for pumping the liquid from the bottom of the tank through the spray nozzles 32. A plurality of fans 35 are also provided in apertures 37 in the walls of the tank but are arranged to draw air from the exterior of the tank through openings 45, which may be preferably screened with filtering cloths 46, or other suitable means employed, so as to remove the impurities from the air before entrance into the tank.

In the operation of this form of apparatus, the liquid to be treated is introduced into the tank at a temperature preferably considerably above that of the external atmosphere, at which temperature it is maintained by suitable manipulation of the coil 15, and as the liquid is pumped through the spray nozzles a circulation of atmospheric air is induced in the tank by means of the fans 35, which serves to evaporate the alcoholic content from the liquid, which is dissipated into the surrounding atmosphere as the air passes out of the tank through the neck 3. Of course, in this form of apparatus there is somewhat greater danger of losing the ethers, aromas, and bouquets of the liquid being treated than in the form of apparatus hitherto described, but under certain conditions this is not objectionable, and as this form of apparatus is preferably operated at rather low temperatures ordinarily but little evaporation of these elements occurs.

While I have hereinbefore given a certain example of the temperatures at which the process may be satisfactorily carried out, it will be understood that I do not desire to confine myself thereto in any way, as satisfactory results may be obtained between a relatively great range of temperatures, for example, the liquid being treated may be kept at a temperature as low as 10° below zero or as high as 140° F. with satisfactory results, and the gases and vapors in contact with the liquid may also be maintained at substantially any range between these extremes as may be desired, provided that at all times a sufficient difference between their respective temperatures is maintained to effect the desired rapidity of dealcoholization. It will be understood that since the liquid being treated is always in rapid circulation, danger of its freezing at the lower temperatures mentioned is eliminated, while the freezing point of the condensed low wines is naturally considerably lower than that of the liquid from which the alcoholic content is being abstracted. Furthermore, under certain conditions of operation it will be found that the alcoholic vapors condense out on the cooling coils 10 in the form of frost, and under these circumstances it will be necessary, from time to time, to discontinue the process for the purpose of de-frosting the coils by raising their temperature, or in any other suitable manner.

While I have herein described certain forms of apparatus suitable for carrying out the process, I do not desire or intend to limit the use of the process solely in connection therewith, as other suitable forms of apparatus may be used as desired, and modifications may also be made when required in the details of the forms of apparatus which I have described. Nor is the use of the process limited to any particular kind of beverage or other liquid, as it is adapted for use with any liquid from which it is desired to remove substantially all, or any desired portion, of the alcoholic content, and as I have stated, the process may be carried out at varying ranges of temperature and at pressures either greater or less than atmospheric as may be desired.

Having thus described my invention, I claim and desire to protect by Letters Patent of the United States:

1. A cyclic process of dealcoholizing a beverage or the like which comprises continuously pumping the beverage from a body thereof contained in a receptacle, returning the pumped beverage to the receptacle in finely divided form through the gases and vapors given off by the beverage so as to effect intimate contact of the beverage therewith while maintaining the finely divided beverage at a higher temperature than that of said gases and vapors, effecting condensation from said gases and vapors of alcohol thereby taken up from the finely divided beverage and thereafter again bringing said gases and vapors into intimate contact with the beverage.

2. The steps in a process of dealcoholizing a beverage or the like which comprise maintaining a body of the beverage in a tank at a temperature between 10° below zero and 140° F., pumping the beverage from the tank, bringing the pumped beverage into intimate contact with a gaseous medium maintained at a lower temperature than the temperature of the beverage, returning the pumped beverage to the tank after said contact, condensing from the medium alcohol which has been taken up thereby, and re-circulating the medium and the beverage within the tank after said condensation step.

3. The process of dealcoholizing beverages or the like, which consists in maintaining a body of the beverage within a tank at a predetermined temperature, continuously withdrawing a portion of said beverage from said tank and returning the same thereto and causing a continuous circulation of a gaseous medium from within a casing surrounding said tank through said tank and thence to said casing whereby intimate contact of the pumped beverage and the gaseous medium is established.

4. The process of dealcoholizing beverages or the like which comprises the maintenance of a body of the beverage within a tank at a predetermined temperature, the continual withdrawal of a portion of the beverage from the tank and the return of the same thereto in finely divided form, the continuous circulation of a gaseous medium within a casing surrounding the tank, thence through the tank and thence again to the casing said medium being maintained at a temperature lower than that of the beverage, the condensation from the medium and within the casing of the alcohol taken up from the beverage during its contact therewith, and the collection of the condensed alcohol within the casing.

5. An apparatus for the dealcoholization of liquids comprising a tank, heating means within said tank, means for withdrawing liquid from the bottom of said tank and returning the same to said tank in finely divided form, a casing surrounding said tank and spaced therefrom, and cooling means interposed between said tank and said casing.

6. An apparatus for the dealcoholization of liquids comprising a tank, heating means within said tank, means for withdrawing liquid from said tank and returning the same thereto in the form of a spray, a casing surrounding said tank and spaced therefrom, cooling means interposed between said casing and said tank, and means for causing a continuous circulation of a gaseous medium from within said casing to said tank and thence outwardly from said tank to the interior of said casing.

7. An apparatus for dealcoholizing liquids comprising a tank having an upwardly projecting neck, a casing surrounding said tank and said neck, heating means disposed within said tank, cooling means disposed within said casing and surrounding said tank, and means for causing a circulation of a gaseous medium upwardly in said tank and over said cooling medium, whereby alcohol evaporated from said liquid is caused to pass over said cooling medium, is condensed thereon and collects at the bottom of said casing.

In witness whereof, I have hereunto set my hand this 20th day of February, A. D., 1920.

CHARLES H. CASPAR.